United States Patent Office.

CYRUS F. BRACKETT, OF BRUNSWICK, AND GEORGE L. GOODALE, OF SACO, MAINE.

Letters Patent No. 70,317, dated October 29, 1867.

---

IMPROVED PROCESS OF EXTRACTING SALINE MATTERS FROM MARINE PLANTS.

---

*The Schedule referred to in these Letters Patent and making part of the same.*

---

TO ALL WHOM IT MAY CONCERN:

Be it known that we, CYRUS F. BRACKETT, of Brunswick, county of Cumberland, State of Maine, and GEORGE L. GOODALE, of Saco, county of York, in said State, have invented a new and improved Process for Extracting all Saline Matters from Marine Plants; and we do hereby declare that the following is a full, clear, and exact description thereof, which will enable those skilled in the art to make and use the same.

The process is simple, and can be easily understood without any model. It consists in the application of dialysis to the separation of crystalline substances from the cellular tissue of sea-weeds and other marine plants. Dialysis—so called by Professor Graham, of the British mint, who first published researches upon the subject—is a method of separating crystalline substances from uncrystallizable substances, with which they may be mixed, by means of a membrane, as parchment, which is used as a bottom for a shallow vessel in which the mixed substances are placed. The vessel is then floated in a basin containing pure water. By some obscure physical relations, very imperfectly understood, the crystalline substances pass through the membrane into the pure water, while the uncrystallizable matter remains behind.

This process, as extensively employed in toxicological laboratories, is used to separate crystallizable poisons from animal tissues.

The apparatus consists of a simple membrane, usually of "parchment-paper," stretched upon a hoop of glass, thus forming a shallow vessel. This is now placed in a stratum of pure water or other desirable solvent of the crystalline bodies, and the mixture to be operated upon is finely comminuted and deposited upon the layer of parchment. This is the ordinary method of employing the process of dialysis, which is familiar to all chemists.

It is well known that the ordinary methods of extracting the saline constituents of sea-weeds, by incineration and lixiviation, are productive of much loss by waste.

Our process, which we claim is much more economical, is substantially as follows: Wet sea-weeds, or wrack-grass, or other marine plants, are crushed to pulp and macerated in water for an indefinite number of hours. The wet pulp is next placed in a large, shallow vessel, constructed with a metallic rim and a bottom of parchment or other suitable membrane, a layer of coarse wire gauze supporting the membrane and the contents of the vessel. The frame, just described, is suspended in a shallow sink of metal, containing pure water. The saline constituents now transude through the membrane, and are dissolved in the water, from which they are freed by subsequent manipulation. The residual mass, from which nearly all the saline constituents have been removed, is utilized, or not, as may be deemed expedient.

In practice, it is found best to use a depth of water in the sink not more than thrice or four times the depth of the pulp. The transudation usually requires a little more than thirty-six hours, and since the process goes on rather slowly for the last twelve hours, it is better to renew the pulp and use fresh water every twenty or twenty-four hours. By this means, a portion of the crystalline constituents is allowed to remain in the pulp.

What we claim, and desire to secure by Letters Patent, is—

The application of dialysis to the extraction of the saline constituents of marine plants, in the manner and for the purposes specified.

C. F. BRACKETT,
GEORGE L. GOODALE.

Witnesses:
H. T. CUMMINGS,
JOHN WILLIAMSON.